(12) United States Patent
Kumar et al.

(10) Patent No.: US 7,906,008 B2
(45) Date of Patent: Mar. 15, 2011

(54) BACTERIUM CONSORTIUM, BIO-ELECTROCHEMICAL DEVICE AND A PROCESS FOR QUICK AND RAPID ESTIMATION OF BIOLOGICAL OXYGEN DEMAND

(75) Inventors: Rita Kumar, New Delhi (IN); Abha Joshi, Delhi (IN); Anil Kumar, Uttranchal (IN); Tushya Kumar Saxena, Delhi (IN)

(73) Assignee: Council of Scientific and Industrial Research, New Delhi (IN)

( * ) Notice: Subject to any disclaimer, the term of this patent is extended or adjusted under 35 U.S.C. 154(b) by 954 days.

(21) Appl. No.: 11/712,892

(22) Filed: Mar. 2, 2007

(65) Prior Publication Data
US 2008/0006539 A1    Jan. 10, 2008

(51) Int. Cl.
*G01N 27/26* (2006.01)

(52) U.S. Cl. ......... 205/746; 422/68.1; 422/79; 205/742; 205/777.5; 205/778; 205/792; 204/403.1; 204/431; 204/432

(58) Field of Classification Search ............ 435/42, 435/176, 177, 182, 289.1; 204/403.01, 431, 204/432; 422/68.1, 79; 205/742, 746, 748, 205/760, 777.5, 778, 792
See application file for complete search history.

(56) References Cited

U.S. PATENT DOCUMENTS

| | | | | |
|---|---|---|---|---|
| 5,531,960 A * | 7/1996 | Zelinka | | 422/79 |
| 5,700,370 A * | 12/1997 | Helmo | | 210/94 |
| 6,511,822 B1 * | 1/2003 | Kumar et al. | | 435/42 |
| 6,531,293 B1 * | 3/2003 | Kumar et al. | | 435/42 |

* cited by examiner

*Primary Examiner* — Bruce F Bell
(74) *Attorney, Agent, or Firm* — Edell, Shapiro & Finnan, LLC

(57) ABSTRACT

The present invention deals with a device for quick estimation of biochemical oxygen demand of beverage waste water. This device consists of an immobilized microbial membrane attached to an electrode, multimeter and a laptop workstation installed with a developed software. BOD measurement of beverage waste water using this device is rapid, reproducible and effective as compared to conventional titration based methods. This device also excludes COD estimation as required for BOD estimation of waste water. This bio-electrochemical device may find wide commercial application in beverage industries emanating waste waters.

3 Claims, 1 Drawing Sheet

BACTERIUM CONSORTIUM, BIO-ELECTROCHEMICAL DEVICE AND A PROCESS FOR QUICK AND RAPID ESTIMATION OF BIOLOGICAL OXYGEN DEMAND

FIELD OF THE INVENTION

The present invention relates to a bacterium consortium useful for quick estimation of biological oxygen demand (BOD) from waste water.

Further, the present invention also relates to a bio-electrochemical device useful for quick and reproducible estimation of biological oxygen demand (BOD) from waste water.

BACKGROUND

The biochemical oxygen demand (BOD) test is a crucial environmental index to determine the relative oxygen requirements of waste waters, effluents and polluted water. It refers to the quantity of oxygen required by bacteria and other microorganisms in the biochemical degradation and transformation of organic matter under aerobic conditions. The test is also interpreted as a measure of the concentration of organic material that can serve as a substrate to support the growth of microorganisms.

The BOD test, as used for assessing the efficiency of waste water treatment, is intended to be a measure of carbonaceous oxygen demand as well as nitrogenous demand. This is known as ultimate BOD. Since ammonia is usually present in some waste waters, nitrification inhibitors must be used to suppress the exertion of nitrogenous oxygen demand. Carbonaceous oxygen demand is called first-stage BOD and nitrogenous oxygen demand is called second stage BOD. In waste waters which do not contain the nitrogenous matter, the oxygen consumed by heterotrophic microorganisms is the carbonaceous BOD. There are number of methods to estimate the water pollution potential. The chemical oxygen demand (COD) test was developed because a BOD5 test requires 5 days for completion and therefore is not suitable either for real-time evaluation of the efficiency of waste water treatment or for operational control of the treatment processes. The total organic carbon (TOC), dissolved organic carbon (DOC), the UV spectrophotometric absorption at 254 nm for dissolved organic material and volatile suspended solids for particulate organic material were developed as alternative methods for measuring the strength of waste water on the basis of an assumption that the primary purpose of biological treatment is to reduce the concentration of organic material in the waste water.

The conventional BOD test has certain benefits such as being a universal method of measuring most wastewater samples, and furthermore, no expensive equipment is needed. It has, however, the limitation of being time consuming, and consequently it is not suitable for on-line process monitoring. Thus, it is necessary to develop a measurement method that could circumvent the weaknesses of the conventional method. The fast, portable and cost effective methods for environmental monitoring have stimulated the development of a variety of field analytical tools such as biosensors. Biosensors are devices that transduce a selective biochemical response to a measurable signal. Several biosensor methods for BOD measurement have been developed. The first report of BOD biosensor was published by Karube et al. in 1977. After that, several kinds of microbial BOD sensors have been developed and various modifications have been carried out. Most of the above reported BOD sensors consisted of a synthetic membrane with single or a random combination of immobilized microorganisms serving as biocatalyst. A rapid and reliable BOD sensor should aim at being highly capable of analyzing a sample of complex constituents with relatively low selectivity but high sensitivity. Thus, the sensor can respond to all kinds of biodegradable organic solutes in the samples. It is also important that the sensor should give results comparable to those obtained using the conventional BOD method.

Most of previously reported BOD sensors are bio-film type whole-cell-based microbial sensors, which rely on measuring the bacterial respiration rate in close proximity to a suitable transducer. A common feature of these sensors is that they consist of a microbial film sandwiched between a porous cellulose membrane and a permeable membrane as the biological recognition element. This microbial film is immobilised microbial populations that can bio-oxidize the organic substrate to be quantified. The response is usually a change in concentration of dissolved oxygen (DO) or other phenomena such as light emission. A physical transducer is used to monitor this process. The result is a change in an electrical or optical signal. The signal is amplified and correlated to the content of biodegradable material measured.

A biofilm sensor for BOD consists of a DO probe including the oxygen-permeable membrane, with another membrane containing bacteria (the biofilm) between the membrane and the sample. Organic material diffuses into the biofilm where the bacteria act on it, causing a drop in oxygen levels that is measured by the probe. The probe is calibrated by setting a baseline level ('zeroing') with a solution containing no organic material, followed by measuring the steady-state response in a solution of known BOD—normally 150 mg glucose plus 150 mg glutamic acid in 1 litre of distilled water taken as approximately 200 mg l-1 BOD. The response of unknown samples is proportioned to the standard to obtain the BOD result. The time quoted to reach a steady reading varies from under 10 minutes to 30 minutes.

A related technique utilizing fluidized bed biology (in place of the biofilm) with DO probes has been incorporated into a commercially available instrument.

Another method uses a biofilm as in the previous method but, instead of waiting for a steady-state reading, it measures the rate of change of oxygen uptake by the bacteria, obtaining results in approximately 1 minute.

The methods are similar to a BOD test, using bacterial activity for their measurement and consequently responding strongly to easily biodegradable material. Many researchers use a monoculture; how well this approximates a mixed culture a response will depend mainly on the sample. Some researchers have had trouble obtaining reproducible results from sensors that used mixed microorganisms from activated sludge.

Apart from the effects of dilution on BOD, the biofilm sensors cannot include degradation of organic particulate matter to any significant extent since the bacteria are immobilized within the sensor system. It has been shown, however, that the biofilms can be acclimatized to different substrates (wastewater as well as pure compounds) to give improved responses.

Biofilm techniques allow rapid process control; they are most likely to find application in monitoring a consistent organic process waste.

OBJECTS OF THE INVENTION

The main object of the present invention is to provide a bacterium consortium useful for quick estimation of biological oxygen demand (BOD) from waste water.

Another object of the present invention is to provide a bio-electrochemical device useful for quick and reproducible estimation of biological oxygen demand (BOD) from waste water.

Further another object of the present invention is to provide a bio-electrochemical device which device measures BOD of waste water in very short time and measurement is highly reproducible.

Yet another object of the present invention is to provide a process for quick estimation of biological oxygen demand (BOD) from waste water using waste water.

SUMMARY OF THE INVENTION

The present invention provides a bio-electrochemical device useful for the quick estimation of BOD of beverage waste water using a charged nylon membrane with attached consortium of at least five bacteria with the help of an electrode, multimeter and a laptop workstation installed with a developed software. This device comprises a consortium of specific bacteria immobilized on a nylon membrane attached to electrode. BOD measurement of beverage waste water using this device is a rapid, reproducible and effective as compared to conventional titration based methods. This device also excludes COD estimation as required for BOD estimation of waste water.

DETAILED DESCRIPTION OF THE INVENTION

Figure 1:
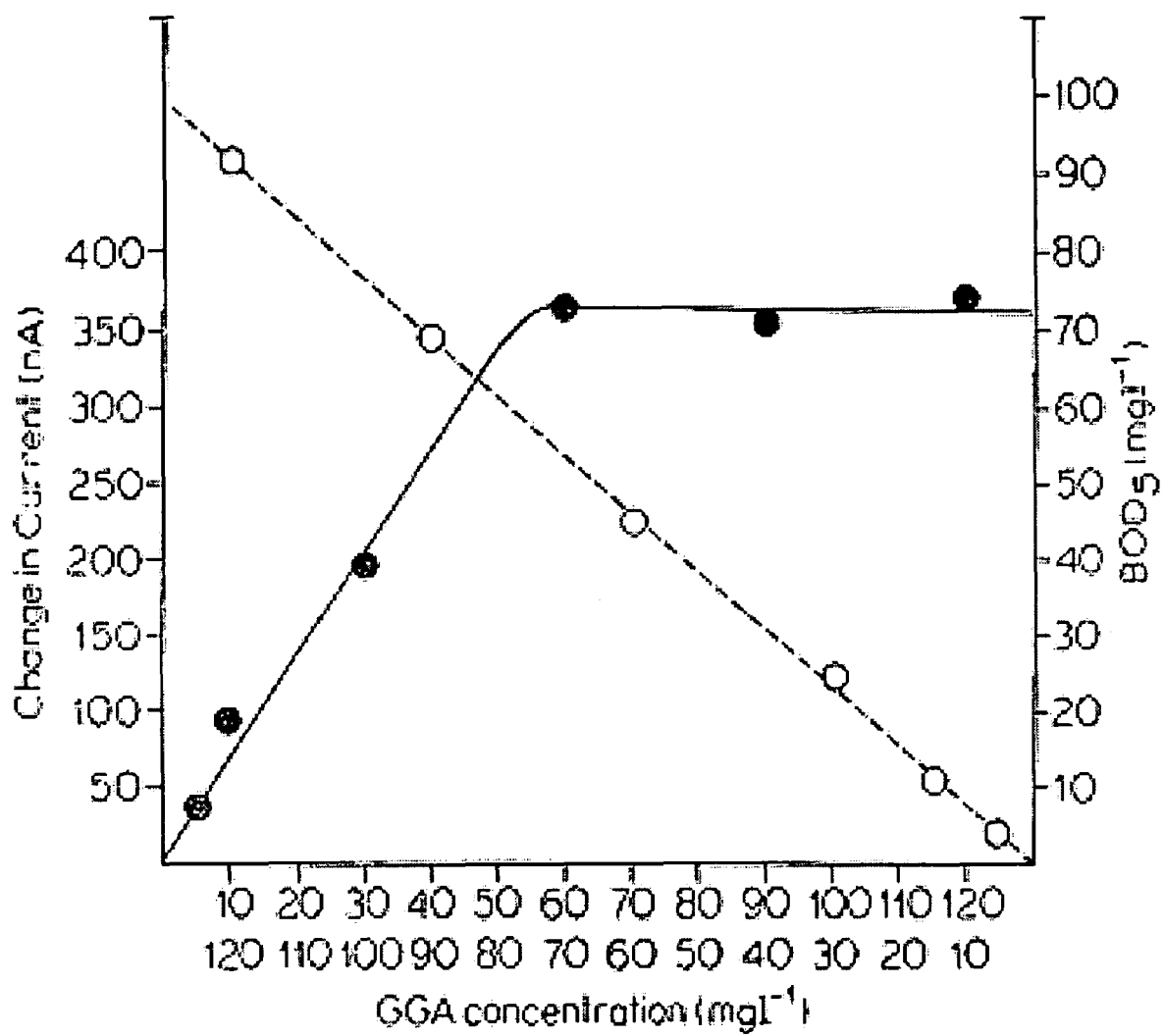
FIG. 1 is a calibration curve depicting the correlation of bio-electrochemical device with conventional $BOD_5$ in accordance with an embodiment of the present invention.

Accordingly, the present invention provides a bacterial consortium useful for the quick estimation of biological oxygen demand (BOD) of beverage waste water, wherein the said consortium comprising at least five bacteria selected from the group consisting of *Aeromonas hydrophila* having ATCC number PTA-3751, *Pseudomonas aeruginosa* having ATCC number PTA-3748, *Yersinia enterocolitica* having ATCC number (PTA-3752), *Pseudomonas fluorescens* having ATCC number (PTA-3749), *Enterobacter cloaca* having ATCC number (PTA-3882), deposited at International Depository (American type culture collection) recognized by Budapest Treaty.

In an embodiment of the present invention, the used bacterial strains *Aeromonas hydrophila* having ATCC number PTA-3751, *Pseudomonas aeruginosa* having ATCC number PTA-3748, *Yersinia enterocolitica* having ATCC number PTA-3752, *Pseudomonas fluorescens* having ATCC number PTA-3749, *Enterobacter cloaca* having ATCC number PTA-3882 are mixed in equal proportions.

In another embodiment of the present invention, the used bacteria have the following characteristics:
 a) *Aeromonas hydrophilaium* having ATCC number PTA-3751 has the following characterists: gram negative rods, motile by a single polar flagellum, metabolism of glucose is both respiratory and fermentative, oxidase positive, catalase positive, ferments salicin, sucrose and mannitol.
 b) *Pseudomonas aeruginosa* having ATCC number PTA-3748 has the following characteristics: gram negative, aerobic rod shaped bacteria, have polar flagella, metabolism is respiratory, never fermentative, oxidase positive, catalase positive and denitrification positive.
 c) *Yersinia enterocolitica* ATCC number PTA-3752 has the following characteristics: gram negative rods, facultative anaerobic, having both respiratory and fermentative type of metabolism, oxidase negative, motile, produce acid from sucrose, cellobiose, sorbose and sorbitol.
 d) *Pseudomonas fluorescens* having ATCC number PTA-3749 has the following characteristics: gram negative, aerobic rod shaped bacteria, have polar flagella, metabolism is respiratory, never fermentative, catalase positive, produces pyoverdin and gelatin liquefaction positive.
 e) *Enterobacter cloaca* having ATCC number PTA-3882 has the following characteristics: gram negative straightrods, motile by peritrichous flagella, facultative anaerobe, ferments glucose with production of acid and gas, KCN and gelatinase positive, nitrate reductase positive.

Further, in another embodiment of the present invention, the above said bacterial strains are cultured in nutrient media and growth is monitored to obtain the desired O.D at 300 C/120 rpm/12-18 hrs.

Yet in another embodiment of the present invention, the growth of said bacterial strains is monitored at 650 nm.

Still in another embodiment of the present invention, bacterial culture is centrifuged and suspended in phosphate buffer, 0.025-0.075 M, pH 6.4-7.2 to make the consortium.

Still in another embodiment of the present invention, centrifuged pellet is collected and dissolved in 2.0-4.0 ml phosphate buffer, 0.025-0.075 M, pH 6.4-7.2, to obtain cell slurry for cell immobilization.

Still in another embodiment of the present invention, the obtained immobilized microbial membrane is dried.

Still in another embodiment of the present invention, dried immobilized microbial membrane is stored and viability of microorganisms is checked in the immobilized microbial membrane.

Further, the present invention also provides a bio-electrochemical device useful for the quick and reproducible biological oxygen demand (BOD) estimation from beverage waste water, wherein the said device comprises of:
 (a) microbes immobilized electrode,
 (b) multimeter and;
 (c) a laptop workstation installed with required software.

In an embodiment of the present invention, the said microbes immobilized electrode is prepared by sandwiching the immobilized microbial membrane between an oxygen permeated membrane and a porous membrane followed by the fixing directly on to the platinum cathode of a commercially available O2 probe.

In another embodiment of the present invention, the immobilized microbial membrane is prepared by immobilization of microbial consortium on membrane.

Further, in another embodiment of the present invention, the membrane used for preparing immobilized microbial membrane is nylon membrane.

Yet in another embodiment of the present invention, the oxygen permeated membrane used is teflon membrane.

Still in another embodiment of the present invention, the porous membrane used is nylon net (00-400 mesh).

Still in another embodiment of the present invention, the said multimeter is connected to the laptop workstation through an electronic interface card.

Still in another embodiment of the present invention, the multimeter is capable to measure the current in nano ampere.

Still in another embodiment of the present invention, the used electrode is a clark type electrode.

Still in another embodiment of the present invention, the software used is "BioSensBOD" required for graphical displays, BOD calculation, online data acquisition and other calculations.

The present invention also provides a process for the quick estimation of BOD of beverage waste water using bio-electrochemical device, wherein the said process comprising the steps of:
a) providing bio-electrochemical device;
b) applying an external polarization voltage of −0.62 to −065 V to the microbes immobilized electrode assembly of said bio-electrochemical device;
c) stabilizing the said electrode assembly in 0.025-0.075 M phosphate buffer at pH 6.4-7.2 for 30-45 minutes followed by addition of 5-60 mg/ml of glucose glutamic acid (GGA) in phosphate buffers;
d) observing the stability of the immobilized microbial membrane through software using stabilized electrode assembly of said device by measuring the change in oxygen concentration in terms of current covering a used range of glucose glutamic acid (GGA) concentrations i.e. 15-75 mg/lit;
e) calibrating the change in current for different concentrations of GGA as obtained from step (d) with the conventional BOD values;
f) replacing the GGA solution with fresh phosphate buffer and stabilizing the assembly;
g) adding the beverage waste water in 0.025-0.075 M phosphate buffer at pH 6.4-7.2 to maintain the percentage as determined by software;
h) observing the change in oxygen concentration in terms of current with the help of software;
i) calculating the BOD values using software with the help of calibration curve by putting the change in current.

In an embodiment of the present invention, the waste water is collected from any beverage industry.

In another embodiment of the present invention, the electrode is dipped in phosphate buffer, 0.025-0.075 M, pH 6.4-7.2 stirring on magnetic stirrer.

Further, in another embodiment of the present invention, the said device is capable to estimate the load of BOD from waste water varying from 300-2250 mg/lit of BOD at various period of time.

Following bacteria are used to develop bio-electrochemical device which is useful for rapid and reproducible BOD estimation of beverage waste water.

| S. No. | Culture | Deposition No. |
| --- | --- | --- |
| 1. | *Aeromonas hydrophila* | PTA-3751 (ATCC) |
| 2. | *Pseudomonas aeruginosa* | PTA-3748 (ATCC) |
| 3. | *Yersinia enterocolitica* | PTA-3752 (ATCC) |
| 4. | *Pseudomonas fluorescens* | PTA-3749 (ATCC) |
| 5. | *Enterobacter cloaca* | PTA-3882 (ATCC) |

The bacterial cultures of the above microbial consortium are isolated from sewage. Sewage samples are collected from Okhla Coronation Plant near Okhla, New Delhi.

To develop the bio-electrochemical device for rapid and reproducible BOD estimation of beverage waste water, different biological and electronic components were arranged. The electrode used in the invention is a clark type of electrode which is connected to multimeter which in turn is connected to a laptop workstation installed with a software necessary for required graphical displays, online data acquisition and other calculations.

For the preparation of electrode assembly, the immobilized microbial membrane is sandwiched between an oxygen permeated teflon membrane and a porous membrane, i.e., cellulose acetate membrane, nylon net etc. The immobilized microbial membrane is fixed directly onto the platinum cathode of a commercially available $O_2$ probe.

The immobilization of bacteria on nylon membrane is carried out by inoculating the individual strains of the above mentioned bacteria separately in nutrient broth containing (per litre), 5.0 g peptic digest of animal tissue, 5.0 g of sodium chloride, 1.5 g of beef extract, 1.5 g yeast extract and 0.2 ml tween-80. All the cultures are incubated preferably at 37.degree. C. for approximately 16-24 hours in an incubator shaker. For gentle shaking, the incubator shaker is maintained at an appropriate rpm, preferably at 75 rpm. After sufficient growth is obtained, the bacterial cells from these individual cultures are taken in equal proportions based on optical density and then mixed for formulating microbial consortium. The resultant bacterial suspension is centrifuged at an appropriate rpm, preferably at 10,000 rpm for a period of 20 minutes. The resultant pellet is washed by dissolving in minimum quantity of phosphate buffer, 0.05 M, pH 6.8 and recentrifuged at an appropriate rpm, preferably at 10,000 rpm for a period of approximately 20 minutes. During centrifugation, the temperature is maintained preferably at 4.degree. C. The pellet thus obtained is immobilized on various membranes/supports such as charged nylon membrane.

The following examples are given by way of illustration of the present invention and should not be construed to limit the scope of present invention.

Example 1

Preparation of Immobilized Microbial Membrane

The immobilization technique of formulated microbial consortium of the present invention is carried out by inoculating the individual strains of the above mentioned bacteria separately in nutrient broth containing (per litre), 5.0 g peptic digest of animal tissue, 5.0 g of sodium chloride, 1.5 g of beef extract, 1.5 g yeast extract and 0.2 ml tween-80. All the cultures are incubated preferably at 37.degree. C. for approximately 16-24 hours in an incubator shaker. For gentle shaking, the incubator shaker is maintained at an appropriate rpm, preferably at 75 rpm. After sufficient growth is obtained, the bacterial cells from these individual cultures are taken in equal proportions based on optical density and then mixed for formulating microbial consortium. The resultant bacterial suspension is centrifuged at an appropriate rpm, preferably at 10,000 rpm for a period of 20 minutes. The resultant pellet is washed by dissolving in minimum quantity of phosphate buffer, 0.05 M, pH 6.8 and recentrifuged at an appropriate rpm, preferably at 10,000 rpm for a period of approximately 20 minutes. During centrifugation, the temperature is maintained preferably at 4.degree. C. The pellet thus obtained is immobilized on various membranes/supports such as charged nylon membrane and polyvinyl alcohol+nylon cloth.

For the immobilization of formulated microbial consortium on charged nylon membrane, the pellet of formulated microbial consortium is dissolved in 2 ml of phosphate buffer, 0.05M. pH 6.8 and filtered under vacuum. A number of immobilized microbial membranes are prepared under varying conditions of cell density and phase of cell growth. The immobilized microbial membranes thus obtained are left at room temperature for 4-6 hours to dry and stored at an appropriate temperature, preferably at 4.degree. C.

The immobilized microbial membranes thus obtained, are characterized with respect to cell density and phases of cell growth. For this, the individual microorganisms are grown for different time periods and a range of cell concentration is used for the immobilization on charged nylon membrane. The viability and stability of the immobilized microbial consortium is checked by storing at different pH and different temperatures. For checking the viability of immobilized microbial membranes, the membrane is placed on an agar plate in an inverted position and incubated at 37.degree. C. overnight. The colonies were observed for growth on agar plates. For the stability study, the prepared immobilized microbial membranes are stored at different temperatures i.e., 4.degree. C., 15.degree. C., 25.degree. C. & 37.degree. C. and different pH ranging from 6.4-7.2. The response of immobilized microbial membranes is observed at regular time intervals.

Example 2

Preparation of a Calibration Curve for Immobilized Microbial Membrane

GGA was used as a reference standard for all BOD measurements and for the calibration of the beverage sensor as well. Stock solution of GGA having a concentration of 12,000 mg/l was prepared. Different aliquots from the stock solution of GGA were added in the measuring cell of the BOD sensor system, to achieve desired GGA concentrations of 15-300 mg/l (having a BOD of 11-220 mg/l). The response of the sensor with different GGA concentrations was observed and recorded. The readings were plotted and on the same graph, a second mantissa was drawn showing the conventional BOD (BOD5) values against the same GGA concentrations as used with the developed BOD sensor. The linearity of GGA was observed to be between 15 mg/l to 60 mg/l as determined with bioelectrochemical device, as shown in FIG. 1.

Example 3

Selection of Dilution of Beverage Waste Water in Order to Estimate the BOD of Waste Water Using Developed Device The linear range of the developed bio-electrochemical device was up to a GGA concentration of 60 mg/l. The industrial wastewater samples having a high BOD load as calculated from BOD5 analysis do not fall in the linear range of the calibration curve. Therefore, the industrial effluents need to be diluted before their BOD estimation using the developed BOD sensor. For the above said purpose, the percentage of each industrial wastewater sample had to be calculated according to the following devised formula:

$$\% \text{ of industrial } wastewater = \frac{\text{Linear range of the sensor} \times \text{vol. of buffer in the measuring cell}}{BOD_5 \text{ value of the industrial } wastewater}$$

Finally, a range of concentrations for each of the wastewater sample above and below the calculated percentage were checked for their BOD load with the help of the developed bio-electrochemical device in order to achieve authentic and accurate results.

It was observed that the BOD values as determined by bio-electric device using the above formula were comparable with the $BOD_5$ (table 1).

TABLE 1

BOD VALUES OF BEVERAGE WASTE WATER AS DETERMINED BY BOD SENSOR AND COMPARISON OF VALUES WITH $BOD_5$ AND EXPECTED BOD

| S. no. | COD (mg/l) | Expected BOD (mg/l) | BOD sensor | | | $BOD_5$ | |
|---|---|---|---|---|---|---|---|
| | | | | % used | BODs | | |
| 1. | 1294 | 906 | 4.96 | 4.00 | 1025 | 890 | +5.6 |
| | | | | 4.25 | 1082 | | |
| | | | | 4.50 | 1000 | | |
| | | | | 4.75 | 989 | | |
| | | | | 5.00 | 940 | | |
| | | | | 6.00 | 733 | | |
| 2. | 823 | 576 | 7.8 | 6.00 | 680 | 550 | +12.7 |
| | | | | 7.00 | 663 | | |
| | | | | 8.00 | 620 | | |
| | | | | 8.25 | 545 | | |
| | | | | 8.50 | 553 | | |
| | | | | 8.75 | 560 | | |
| | | | | 9.00 | 522 | | |
| 3. | 1085 | 760 | 6.0 | 4.00 | 650 | 564 | −2.5 |
| | | | | 5.00 | 500 | | |
| | | | | 6.00 | 550 | | |
| 4. | 990 | 697 | 6.45 | 5.00 | 640 | 620 | +3.2 |
| | | | | 8.00 | 513 | | |
| | | | | 10.00 | 380 | | |
| 5. | 992 | 694 | 6.48 | 5.00 | 760 | 693 | +1.7 |
| | | | | 6.00 | 720 | | |
| | | | | 7.00 | 705 | | |
| 6. | 1500 | 1050 | 4.0 | 4.00 | 1050 | 1098 | −4.4 |
| | | | | 5.00 | 1087 | | |
| 7. | 1077 | 754 | 5.96 | 5.00 | 800 | 815 | +2.2 |
| | | | | 6.00 | 833 | | |
| 8. | 512 | 358 | 12.56 | 10.00 | 460 | 410 | −2.4 |
| | | | | 11.00 | 409 | | |
| | | | | 12.00 | 400 | | |
| 9. | 3370 | 2359 | 1.9 | 1.00 | 2286 | 2250 | −8.9 |
| | | | | 1.50 | 2105 | | |
| | | | | 2.00 | 2050 | | |
| | | | | 3.00 | 1733 | | |
| 10. | 417 | 292 | 15.4 | 14.00 | 314 | 300 | −1.7 |
| | | | | 15.00 | 307 | | |
| | | | | 15.25 | 295 | | |
| | | | | 15.50 | 316 | | |
| | | | | 15.75 | 311 | | |
| | | | | 16.00 | 256 | | |
| 11. | 1150 | 805 | 5.6 | 5.00 | 940 | 777 | +5.1 |
| | | | | 6.00 | 817 | | |
| | | | | 6.50 | 831 | | |
| | | | | 6.75 | 785 | | |
| | | | | 7.00 | 729 | | |
| 12. | 2576 | 1803 | 2.49 | 2.00 | 2050 | 1820 | +3.3 |
| | | | | 2.50 | 1880 | | |
| | | | | 2.60 | 1808 | | |
| | | | | 2.70 | 1778 | | |
| | | | | 3.00 | 1533 | | |
| 13. | 1946 | 1362 | 3.3 | 2.00 | 1400 | 1245 | +2.4 |
| | | | | 3.00 | 1467 | | |
| | | | | 4.00 | 1275 | | |

Example 4

Direct Determination of BOD Load Using the Bio-Electrochemical Device with the Help of Software To estimate the BOD of beverage waste water using developed bio-electrochemical device, firstly, immobilized microbial membrane was attached with the electrode for the preparation of electrode assembly. The device was assembled by connecting the immobilized electrode to multimeter which in turn is connected to a laptop workstation through an interface card. Laptop workstation is installed with developed software "BioSens$^{BOD}$" build on visual basic platform. This software takes "change in current" values in real time and manipulate them in desired graphical displays.

In starting, electrode was dipped in phosphate buffer placed on the stirrer and external polarization voltage was applied through the multimeter. Applied current was stabilized through multimeter. Then stability of the immobilized microbial membrane was observed as displayed by developed software installed in laptop workstations which in turn is connected to a multimeter through an interface electronic card. Change in oxygen concentration was measured in terms of current covering a range of GGA concentrations by a developed. Change in current was calibrated for different concentrations of GGA. GGA solution was replaced now with fresh phosphate buffer and assembly was stabilized. Ten times diluted real beverage waste water was added in phosphate buffer to maintain the percentage of waste water in order to calculate the actual BOD, as determined by the software. Then change in oxygen concentration was observed in terms of current as displayed by the developed software. Finally, BOD value of waste water, 621 mg/ml, was calculated with the help of calibration curve by putting the change in current as observed through the software. This BOD value was comparable to $BOD_5$ as determined by titration based method as shown below.

| Sample | BOD estimation by bio-electrochemical device | BOD estimation by conventional titration based method |
|---|---|---|
| Beverage waste water | 621 mg/ml | 610 mg/ml |

Advantages:
1. The developed bio-electrochemical device is useful in rapid and reproducible estimation of BOD of beverage waste water.
2. The developed device excludes the COD analysis as required in BOD estimation by titration based conventional method.
3. The device is potable and can be used for online monitoring of BOD of beverage waste water at industrial site.

We claim:
1. A process for quick estimation of BOD of beverage waste water using bio-electrochemical device, wherein the said process comprising the steps of:
   (a) providing bio-electrochemical device comprising:
      i) microbes immobilized membrane attached to a commercially available dissolved oxygen probe;
      ii) multimeter; and
      iii) a laptop workstation installed with software configured to take "change in current" values in real time and manipulate the values in desired graphical displays;
   (b) applying an external polarization of −0.62 V to −0.67 V to the microbes immobilized membrane of said bio-electrochemical device;
   (c) stabilizing the said membrane in 0.025-0.075 M phosphate buffer at pH 6.4-7.2 for 30-45 minutes followed by addition of glucose glutamic acid (GGA) in phosphate buffer;
   (d) observing the stability of the immobilized microbial membrane through software using stabilized membrane of said device by measuring the change in oxygen concentration in terms of current covering a used range of GGA concentrations;
   (e) calibrating the change in current for different concentrations of GGA as obtained from step (d) with the conventional BOD values;
   (f) replacing the GGA solution with fresh phosphate buffer and stabilizing the assembly;
   (g) adding the beverage waste water in 0.025-0.075 M phosphate buffer at pH 6.4-7.2 to maintain the percentage as determined by software;
   (h) observing the change in oxygen concentration in terms of current with the help of software;
   (i) calculating the BOD values using software with the help of calibration curve by putting the change in current as observed in step (h).

2. A process as claimed in claim 1, wherein the waste water is collected from any beverage industry.

3. A process as claimed in claim 1, wherein the said device is capable to estimate the load of BOD from waste water varying from 300-2250 mg/lit of BOD at various periods of time.

* * * * *